United States Patent
Voris et al.

(10) Patent No.: US 9,723,366 B2
(45) Date of Patent: Aug. 1, 2017

(54) SYSTEM AND METHOD TO PROVIDE SUPPLEMENTAL CONTENT TO A VIDEO PLAYER

(71) Applicant: Disney Enterprises, Inc., Burbank, CA (US)

(72) Inventors: James Voris, San Gabriel, CA (US); Mark Arana, West Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 83 days.

(21) Appl. No.: 13/796,324

(22) Filed: Mar. 12, 2013

(65) Prior Publication Data

US 2014/0282691 A1    Sep. 18, 2014

(51) Int. Cl.
| | |
|---|---|
| *H04N 7/18* | (2006.01) |
| *H04N 7/173* | (2011.01) |
| *H04N 7/16* | (2011.01) |
| *H04N 21/4722* | (2011.01) |
| *H04N 21/462* | (2011.01) |

(52) U.S. Cl.
CPC ..... *H04N 21/4722* (2013.01); *H04N 21/4622* (2013.01)

(58) Field of Classification Search
USPC ................... 725/80, 133, 141, 153
See application file for complete search history.

(56) References Cited

U.S. PATENT DOCUMENTS

| 8,095,646 B2* | 1/2012 | Capio et al. ................. 709/224 |
| 8,413,207 B2* | 4/2013 | Fukuda ......................... 725/141 |
| 2010/0124404 A1* | 5/2010 | Park et al. ..................... 386/66 |
| 2012/0233646 A1* | 9/2012 | Coniglio et al. ............... 725/78 |
| 2012/0271638 A1* | 10/2012 | Regler ......................... 704/272 |
| 2013/0040623 A1* | 2/2013 | Chun ................. H04N 21/4126 455/414.2 |
| 2014/0006635 A1* | 1/2014 | Braness ........... H04N 21/23439 709/231 |

OTHER PUBLICATIONS

Patent Cooperation Treaty, International Search Report for PCT/US2014/022772, Jul. 8, 2014, pp. 1-4.

* cited by examiner

*Primary Examiner* — Nasser Goodarzi
*Assistant Examiner* — Fred Peng
(74) *Attorney, Agent, or Firm* — Sheppard, Mullin, Richter & Hampton LLP (57) ABSTRACT

A supplemental content retrieval system is disclosed for playing supplemental video content on a video player. The system comprises a video player for playing video content, a secondary device for receiving supplemental video content, and a remote database for providing supplemental video content, wherein the video player is configured to play the supplemental video content received by the secondary device. A method for using said system is also disclosed.

21 Claims, 5 Drawing Sheets

FIG. 1

FIG. 2
SECONDARY DEVICE METHOD FLOW CHART

FIG. 3
VIDEO PLAYER METHOD FLOW CHART

FIG. 4
SUPPLEMENTAL CONTENT DATABASE METHOD FLOW CHART

FIG. 5

SYSTEM AND METHOD TO PROVIDE SUPPLEMENTAL CONTENT TO A VIDEO PLAYER

TECHNICAL FIELD

The present disclosure relates generally to audio and video content, and, more particularly, to systems and methods for retrieving supplemental content for playback on a video player.

DESCRIPTION OF THE RELATED ART

Consumers who purchase video content now expect additional features and supplemental content in addition to the primary video content. Such supplemental content has become progressively more popular. Some examples of currently available supplemental content include director and actor commentary, alternative language subtitles or audio tracks, soundtrack music videos, and the like. Typically, this supplemental content is delivered on the primary video content media. Examples include the "Bonus Features" on a DVD or Blu-Ray disc.

BRIEF SUMMARY OF THE DISCLOSURE

One aspect of the disclosed system involves using a secondary device to retrieve supplemental content from a supplemental content database, and then playing the retrieved supplemental content on a video player.

In one embodiment, the disclosed system comprises a video player for playing video content, a secondary device in communication with the video player, and a database for storing supplemental content, the database being in communication with the secondary device over a network. The secondary device is configured to receive supplemental content from the database, and the video player is configured to play the supplemental content received by the secondary device.

A method is also disclosed, which embodies the disclosed system. The method comprises the steps of displaying supplemental content information, receiving a request for supplemental content, receiving the requested supplemental content from a database, and transmitting the supplemental content to a video player.

Other features and aspects of the disclosure will become apparent from the following detailed description, taken in conjunction with the accompanying drawings, which illustrate, by way of example, the features in accordance with various implementations.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily to scale.

DETAILED DESCRIPTION

Supplemental video content has become a popular way by which video content providers distinguish their products in a crowded marketplace. This supplemental content can provide consumers with a fuller viewing experience in a variety of ways. For example, by providing director commentaries or bonus footage, video content providers are able to give viewers more personal, "insider" access to the production process. In another example, viewers can get access to alternative viewing experiences through foreign language tracks, or alternate endings. It is now common for video content products to contain both primary video content, e.g., a motion picture, as well as supplemental content, e.g., director's commentary, actor interviews, trailers, alternative endings, foreign language audio tracks, and the like.

However, when video content products are released for sale to consumers, these products are essentially "frozen in time," and no additional changes can be made. This makes it difficult to release video content products quickly to capitalize on the popularity of a product, while also providing a variety of supplemental content, which takes time to develop. Additionally, these products cannot be updated with new content once they have been released and sold. The present disclosure describes a supplemental content retrieval system, by which supplemental content can be retrieved for playing by a video player.

Figure 1:
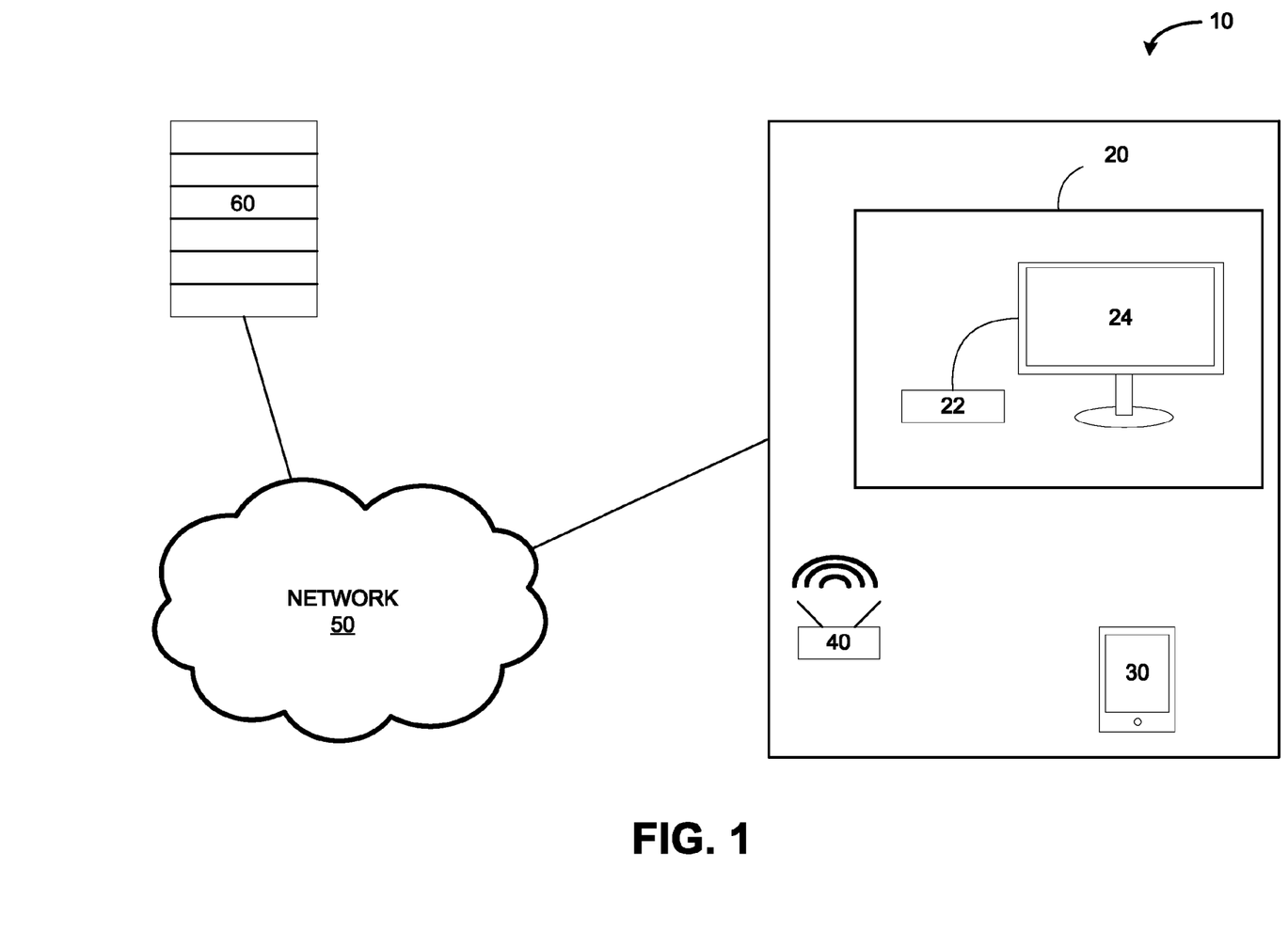
FIG. 1 is a block diagram of a supplemental content retrieval system, in accordance with an embodiment of the present disclosure.

FIG. 1 is a block diagram of a supplemental content retrieval system 10, in accordance with an embodiment of the present disclosure. The system includes a video player 20 and a secondary device 30. The video player 20 is the device on which a user watches a video content product. A common example of a video player 20 would be a television connected to Blu-Ray disc player or DVD disc player. However, the video player 20 is not limited to these embodiments, and may be any device on which video content may be viewed. It should be understood that "video content" may include both video and audio components, and the terms "viewed," "displayed," "played," and the like, encompass both the visual and audio components.

The video player 20 comprises two components, a content reader 22 and a content output 24. These components may be separate devices (e.g., a Blu-Ray player/reader and a television/output), components of a single device, or each component may be carried out by multiple devices (e.g., a content output may include both a television outputting the visual component of video content, and a speaker system outputting the audio component of video content). The video player's content reader 22 "reads" video content, so that the content can be displayed to the user by the content output 24. Video players are common and well known and should be understood to encompass any system by which video content can be read and displayed.

The secondary device 30 provides supplemental content to the video player 20. The secondary device may be a mobile device, such as a cell phone, a smart phone, a tablet, a portable media player, or a handheld game console. The secondary device may also be any other appropriate computing device, such as a personal computer. The secondary device 30 receives supplemental content through a network 50. The network 50 may be a wide-area network, such as the internet, or a local-area network, or anything in between. The network 50 may comprise cellular, WiFi, and/or cable components. The supplemental content is then transferred from the secondary device 30 to the video player 20 so that the supplemental content may be played on the video player 20.

Using a secondary device 30 to search, review, retrieve, receive and transmit supplemental content allows for these actions to be performed without encroaching on the display on which the primary video content is being played. Additionally, traditional video players, such as televisions and home theater systems, are not known for user-friendly interfaces and ease of use in searching, reviewing, and retrieving content. The use of a secondary device 30 allows a user to perform these tasks on more user-friendly devices, such as tablets, mobile phones, portable media players, handheld game consoles, or computers, which have hardware, software, and user interfaces that are more easily applied to the tasks of searching, reviewing, and retrieving supplemental content.

The supplemental content may be stand-alone video content that is played on its own, or it may be video content that augments the original video content. Examples of stand-alone supplemental content might include trailers for a film, interviews with the film's actors, or a music video for the film's theme song. Supplemental content that augments the original video content might include foreign language audio tracks. These tracks can be played at the same time as the original video content's video component, so that a film plays, for example, in Spanish rather than in English. Another example of potential "augmenting" supplemental content might be a director commentary, so that the viewer can see and hear the director watching and discussing the film in the corner of the screen, while the film plays in the background.

Supplemental content may contain only an audio component (e.g., alternative language tracks), only a video component (e.g., foreign language subtitles), or both audio and visual components (e.g., director commentaries discussed above). Additionally, supplemental content may be specific to certain video content, or it may be generally applicable to any video content. An example of such "general" supplemental content would include a video overlay, or a particular visual or audio effect that can be applied to any video content.

While the embodiment shown in FIG. 1 uses a home theater as the video player 20 and a tablet as the secondary device 30, it should be appreciated that a nearly endless number of combinations are possible. Video players may include any device that can read and display video content. Examples include televisions, home theaters, Blu-Ray disc players, DVD players, desktop computers, laptop computers, tablets, mobile phones, in-car entertainment systems, video game consoles, video download or streaming devices, or portable DVD players. A video player may be an individual device, or a combination of multiple devices. A secondary device 30 may be any device that a user can use to review, receive, and transmit supplemental content. Examples include laptop and desktop computers, tablets, mobile phones, or the like. Secondary devices may also comprise a single device, or may comprise multiple devices working together.

To further clarify the interactions between the different components of the system 10, the function and operation of each component will now be discussed in greater detail.

Figure 2:
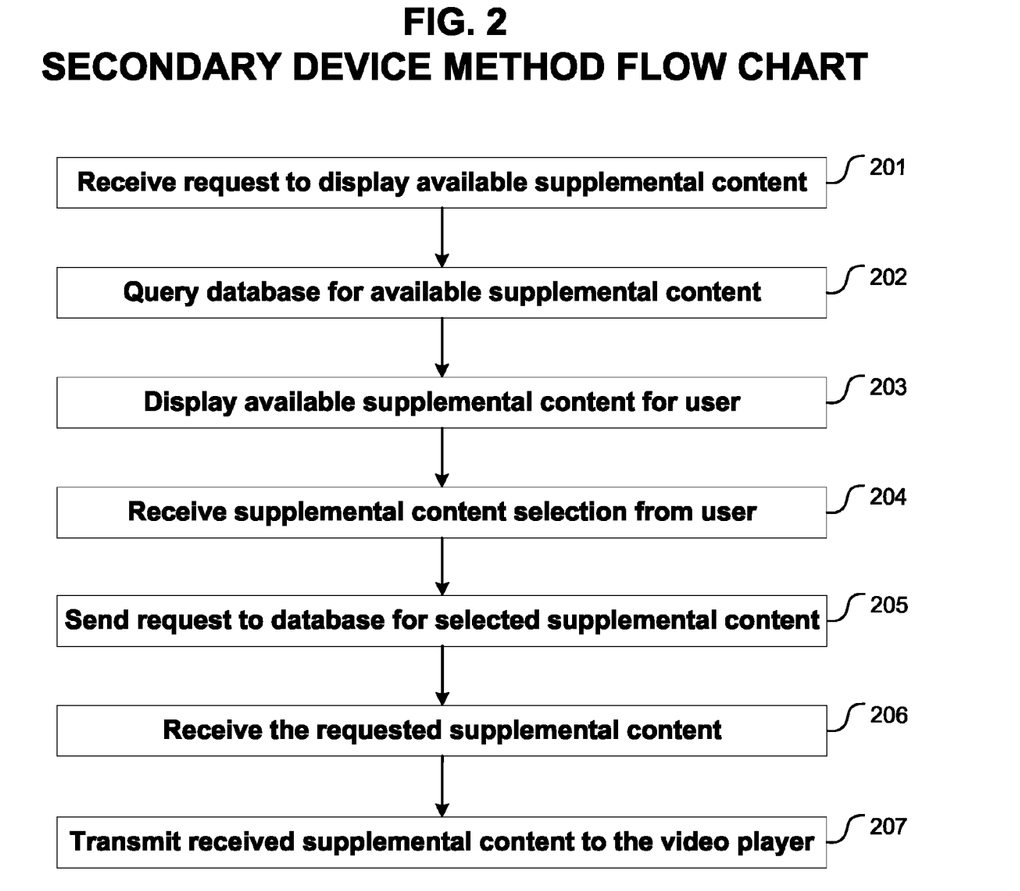
FIG. 2 is a flow chart representing a possible sequence of operations for the secondary device, in accordance with an embodiment of the present disclosure.

FIG. 2 is a flow chart depicting the steps performed by the secondary device 30, in accordance with an embodiment of the present disclosure. The secondary device 30 comprises hardware, software, or firmware to carry out the functions described herein. In step 201, the secondary device 30 receives a request to display available supplemental content. This may be the result of a user-inputted request. For example, a user might open an application on the secondary device 30 or perform a search within the application. Alternatively, the request may occur automatically as a result of the video player 20 detecting a primary video content and sending a signal to the secondary device 30. The requested supplemental content data may include all available supplemental content, or it may be narrowed according specific criteria. Using the sample scenario of a user performing a search, the user might enter a search for the title of the primary video content in order to retrieve only supplemental content available for that title. Alternatively, the secondary device 30 may interact with the video player 20 to receive information about the primary video content. The secondary device 30 can then retrieve a list of available supplemental content for the primary video content. As discussed earlier, "general" supplemental content applicable to any video content may also be requested.

The interaction between the secondary device 30 and the video player 20 may be carried out in a number of ways. The devices could interact with each other directly, much like a remote control and a television. In another embodiment, the devices could interact via a router 40. In this embodiment, the router would be in communication with both devices and facilitate communications between the devices. The router may also facilitate communication between the secondary device 30 and the network 50, such as by a wireless internet connection, or the secondary device 30 could connect to the network directly, using, for example, a 3G/4G cellular connection. The video player 20 and the secondary device 30 may also interact over the network 50 if both devices are connected to the network 50.

Once the secondary device 30 receives a request for supplemental content information, it queries one or more databases 60 to determine what supplemental content is available in step 202. The databases 60 may be any device, system, or apparatus that is capable of storing files, such as one or more hard drives, one or more file servers, or the like. One or more of these databases may be stored locally on the secondary device 30, while additional remote databases 60 may contain additional information not stored locally on the secondary device 30. In step 203, the secondary device 30 displays a list of available supplemental content for selection by a user. In step 204, the secondary device 30 receives a request for supplemental content that has been selected by the user. At step 205, the secondary device 30 sends a request to the remote database for the user-selected supplemental content. The secondary device 30 then receives the requested supplemental content from the remote database at step 206. Finally, at step 207, the secondary device 30 transmits the supplemental content to the video player 20 for playing of the supplemental content.

Figure 3:
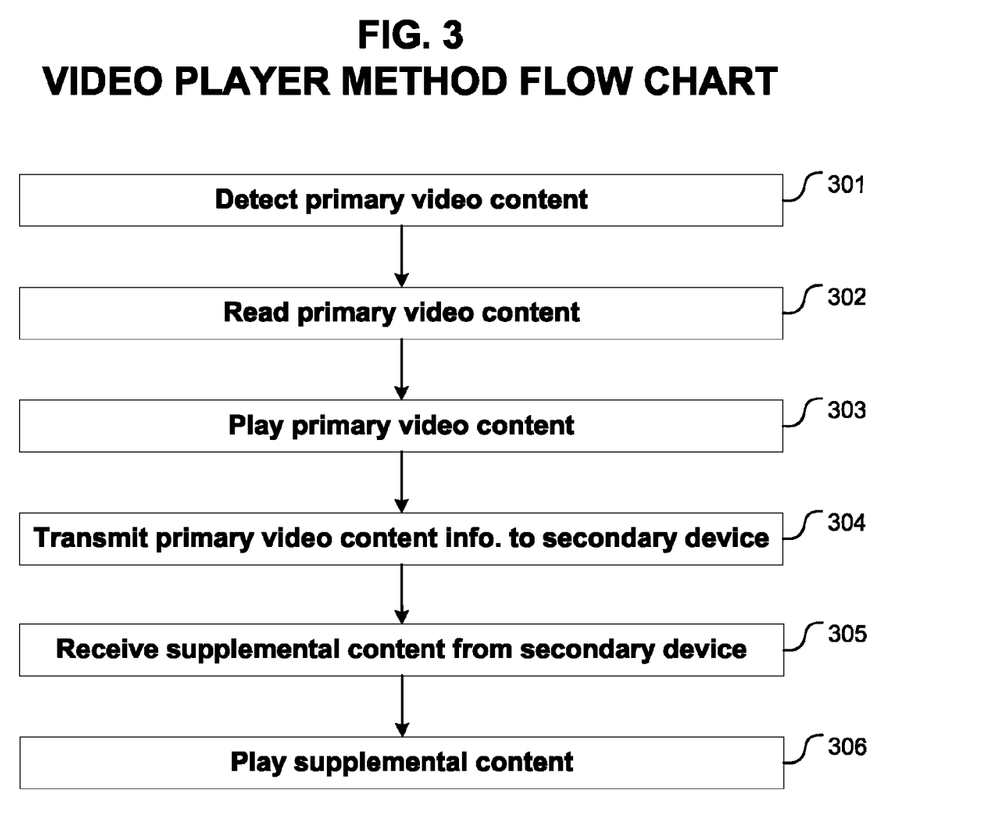
FIG. 3 is a flow chart representing a possible sequence of operations for the video player, in accordance with an embodiment of the present disclosure.

FIG. 3 is a flowchart for the steps performed by the video player 20, in accordance with an embodiment of the present disclosure. The video player 20 comprises hardware, software, or firmware to carry out the functions described herein. In step 301, the video player 20 detects that the user has queued up a primary video content. The user may queue up primary video content by inserting video content media into the video player 20, such as a Blu-Ray disc or DVD. The user could also do this by selecting video content, possibly by selecting a TV channel or selecting streaming content over the internet. Once primary video content is detected, the video player 20 reads the video content in step 302, and plays the video content in step 303. Playing the video content will generally comprise displaying the video component of the video content and audibly projecting the audio component of the video content. At step 304, the video player 20 may then transmit information about the primary video content to the secondary device 30 so that the secondary device 30 can search for applicable supplemental content. This step may not be present in certain embodiments. If not present, the user may manually enter primary video content information into the secondary device 30 to perform the search. At step 305, the video player 20 receives supplemental content from the secondary device. At step 306, the video player 20 plays the supplemental content. Playing of the supplemental content may require, depending on the nature of the supplemental content, playing the supplemental content on its own, or playing of the supplemental content simultaneously with the primary video content.

Figure 4:
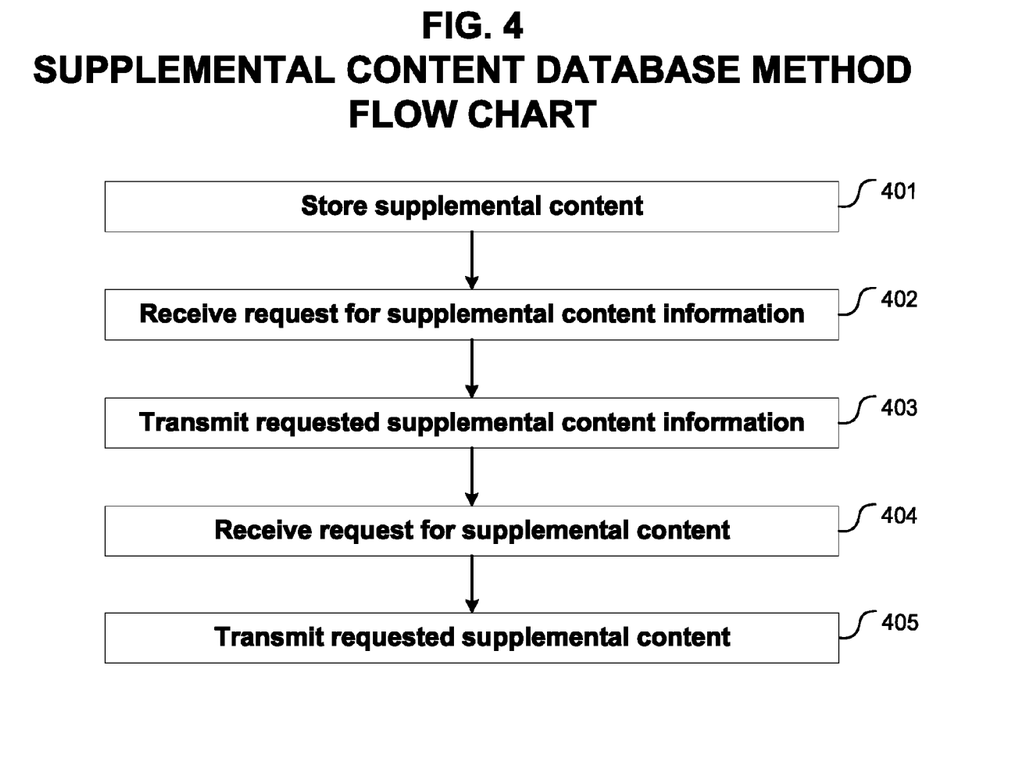
FIG. 4 is a flow chart representing a possible sequence of operations for the supplemental content database, in accordance with an embodiment of the present disclosure.

FIG. 4 is a flowchart for the steps performed by the remote database 60, in accordance with an embodiment of the present disclosure. The database 60 comprises hardware, software, or firmware to carry out the functions described herein. At step 401, the database 60 stores supplemental content. Then, the remote database 60 receives a request for supplemental content information at step 402, and then responds to the request by transmitting the requested supplemental content information at step 403. At step 404, the remote database 60 receives a request for supplemental content. At step 405, the remote database 60 transmits the requested supplemental content.

When the secondary device 30 receives supplemental content from the remote database 60, the supplemental content may be handled in a variety of ways. In one embodiment, the supplemental content is downloaded and stored in non-volatile storage on the secondary device 30, such as a magnetic disc drive, a solid state drive or flash memory. In this embodiment, the downloaded supplemental content can then be accessed locally, negating the need to query the remote database 60 for the content in the future. Alternatively, the supplemental content may be stored only temporarily on the secondary device 30 while the supplemental content is streamed from the secondary device 30 to the video player 20. This embodiment would include querying of the remote database 60 every time the user wants to view supplemental content, including previously viewed content, but the supplemental content would not occupy any long-term storage on the secondary device 30.

Certain types of supplemental content may require that the supplemental content be played simultaneously with the primary video content. An example of this is a foreign language audio track, which would replace the primary video content's original audio track with the supplemental audio track, while still using the original video content's video component. When simultaneous play of supplemental and primary content is performed, it will often be the case that there will be required some method by which the two are synchronized for playback. For example, common start times may be used to sync the primary content and the supplemental content, so that the two are started at the same time. As another example, time codes embedded in the primary video content and in the supplemental content can be used to synchronize the content. In this synchronization method, the supplemental content contains time code data, which can periodically or constantly be matched to time data in the primary video content to ensure that they are in sync with each other. Pre-defined location markers, such as chapter markers, may also be used to synchronize the content. In another embodiment, sub-auditory signals or queues may be used to sync the primary content to the supplemental content. Any other suitable synchronization method may be used with the system disclosed.

Either the secondary device 30 or the video player 20 may perform the task of synchronizing the primary content and the supplemental content. Both devices may also perform the task jointly. For example, the video player 20 may perform synchronization on its own by reading both the primary video content and the supplemental content and comparing their time code data to sync the content as it is playing. Alternatively, the secondary device 30 may perform the sync by receiving queues from the video player 20 as to the current time position of the primary video content, and then transmitting the appropriate supplemental content corresponding to the time position information received. Typically, these queues would not be detectable by the user. Examples of such queues might include sub-auditory tones or other digital or wireless communications.

As used herein, the term module might describe a given unit of functionality that can be performed in accordance with one or more implementations. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the disclosed system are implemented in whole or in part using software, in one embodiment, these software elements can be implemented to operate with a computing or processing module capable of carrying out the functionality described with respect thereto. After reading this description, it will become apparent to a person skilled in the relevant art how to implement the disclosure using other computing modules or architectures.

Figure 5:
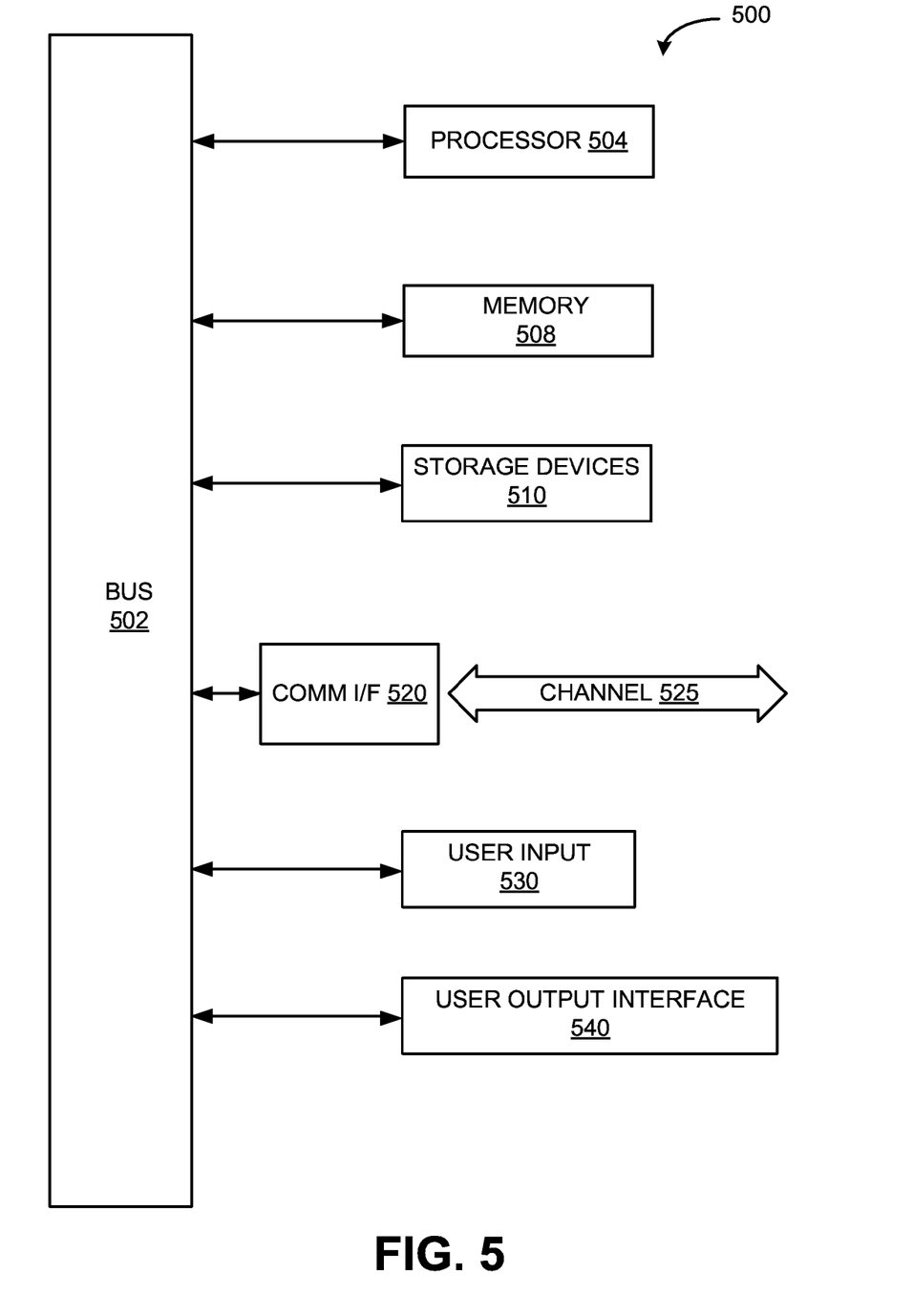
FIG. 5 illustrates an example computing module that may be used in implementing various features.

Referring now to FIG. 5, computing module 500 may represent, for example, computing or processing capabilities found within desktop, laptop and notebook computers; hand-held computing devices (PDA's, smart phones, cell phones, palmtops, tablets, etc.); or any other type of special-purpose or general-purpose computing devices as may be appropriate. Computing module 400 might also represent computing capabilities embedded within or otherwise available to a given device. For example, a computing module might be found in other electronic devices such as, for example, televisions, home theaters, Blu-Ray disc players, DVD players, in-car entertainment systems, video game consoles, video download or streaming devices, portable DVD players, and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 508. Memory may include any non-transitory storage medium. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504. The computing module 500 might also include one or more various forms of information storage mechanism 510, which might include, for example, a magnetic tape drive, an optical disc drive, a solid state drive, or any other non-volatile memory.

Computing module 500 might also include a communications interface 520. Communications interface 520 might be used to allow software and data to be transferred between computing module 500 and external devices. Examples of communications interface 520 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 520 might typically be carried on signals, which can be electronic, electromagnetic (which includes optical) or other signals capable of being exchanged by a given communications interface 520. These signals might be provided to communications interface 520 via a channel 525. This channel 525 might carry signals and might be implemented using a wired or wireless communication medium. Some examples of a channel might include a phone line, a cellular link, an RF link, an optical link, a network interface, a local or wide area network, and other wired or wireless communications channels.

Computing module 500 might also include one or more user inputs 530. The user input allows for the user to enter commands to the computing module 500 and interact with it. Examples of user inputs might include a computer mouse, a keyboard, a touch-sensitive screen, a mousepad, a joystick, or any other user input mechanism. The computer module 500 might also include one or more user output interfaces 540. This interface might be used to interact with the user by presenting information our sensory outputs for the user. Examples of user output interfaces might include visual outputs, such as a display screen or monitor, or audio outputs, such as a speaker or headphone output.

In this document, the terms "computer program medium" and "computer usable medium" are used to generally refer to media such as, for example, memory 508, storage unit 510, and channel 525. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present disclosure as discussed herein.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features. Additionally, with regard to flow diagrams, operational descriptions and method claims, the order in which the steps are presented herein shall not mandate that various embodiments be implemented to perform the recited functionality in the same order unless the context dictates otherwise. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Although the disclosure has been presented with reference only to the presently preferred embodiments, those of ordinary skill in the art will appreciate that various modifications can be made without departing from this disclosure. Accordingly, this disclosure is defined only by the following claims.

The invention claimed is:

1. A supplemental content retrieval system comprising:
   a video content reader configured to play video content;

a secondary device in communication with the video content reader, the secondary device comprising a secondary display; and a database for storing a plurality of supplemental content related to the video content, the database being in communication with the secondary device, wherein the secondary device is configured to:
   display a list of the plurality of the supplemental content stored on the database;
   receive one of the plurality of supplemental content from the database, the received supplemental content being different than, but related to the video content and consisting of at least one of a video or sound track, and wherein the video content reader is configured to play the received supplemental content received by the secondary device simultaneously and in synchronization with the video content using time code data embedded in at least one of the received supplemental content or the video content, wherein playing the received supplemental content simultaneously and in synchronization with the video content using the time code data comprises playing an audio track of the supplemental content in place of an audio track of the video content, and playing the audio track of the supplemental content simultaneously and in synchronization with a video track of the video content using the time code data.

2. The system of claim 1, wherein the video content reader receives streamed supplemental content from the secondary device.

3. The system of claim 1, wherein, the secondary device is further configured to store the received supplemental content in a non-volatile memory.

4. The system of claim 1, wherein, the secondary device is further configured to transmit the received supplemental content to the video content reader without long-term storage of the received supplemental content on the secondary device in a non-volatile memory.

5. The system of claim 1, wherein the secondary device is a mobile device, a portable media player, a handheld game console, or a personal computer.

6. The system of claim 5, wherein the secondary device is a tablet or a mobile phone.

7. The supplemental content retrieval system of 1, wherein the supplemental content is an alternative language soundtrack of the video content or video of director commentary of the video content.

8. A method comprising:
   displaying a list of a plurality of supplemental content on a secondary device, wherein the plurality of supplemental content is stored in a database and is related to a video content, the secondary device comprising a secondary display;
   receiving a request for a supplemental content of the plurality of supplemental content on the secondary device, wherein the requested supplemental content is different than, but related to the video content and wherein the requested supplemental content consists of at least one of a video or sound track;
   receiving on the secondary device the requested supplemental content from the database, the database and secondary device being in communication with one another over a network; and
   transmitting the received supplemental content from the secondary device to a video player to play the received supplemental content, the video player comprising a primary display; and wherein—the video player is configured to play the received supplemental content simultaneously and in synchronization with the video content using time code data embedded in at least one of the received supplemental content or the video content, wherein playing the received supplemental content simultaneously and in synchronization with the video content using the time code data comprises playing an audio track of the supplemental content in place of an audio track of the video content, and playing the audio track of the supplemental content simultaneously and in synchronization with a video track of the video content using the time code data.

9. The method of claim 8, further comprising the step of storing the supplemental content in a non-volatile memory on the secondary device.

10. The method of claim 8, wherein the step of transmitting the received supplemental content from the secondary device to a video player further comprises the steps of:
   communicating with the video player;
   using the communications with the video player to synchronize the received supplemental content with the primary video content;
   and transmitting the received supplemental content from the secondary device to the video player in such a way that the received supplemental content can be played on the video player simultaneously and in synchronization with the primary video content.

11. A method comprising:
   receiving primary video content on a video content reader for displaying on a video content output;
   receiving supplemental content from a secondary device onto the video content reader, the secondary device comprising a secondary display; and
   playing the supplemental content on the video content reader by transmitting the supplemental content to the video content output;
   wherein the supplemental content is different than, but related to the primary video content, wherein the supplemental content consists of at least one of a video or sound track, and wherein the video content reader plays the supplemental content simultaneously and in synchronization with the primary video content using time code data embedded in at least one of the supplemental content or the primary video content, wherein playing the supplemental content simultaneously and in synchronization with the primary video content using the time code data comprises playing an audio track of the supplemental content in place of an audio track of the primary video content, and playing the audio track of the supplemental content simultaneously and in synchronization with a video track of the primary video content using the time code data.

12. The method of claim 11, wherein the step of receiving supplemental content from a secondary device further comprises streaming the supplemental content from the secondary device.

13. The method of claim 11, wherein the step of receiving supplemental content from a secondary device onto the video content reader further comprises the step of sending primary video content information to the secondary device for synchronizing the supplemental content with the primary video content.

14. The method of claim 11, wherein the supplemental content is an alternative language soundtrack of the primary video content or video of director commentary of the primary video content.

15. A non-transitory computer readable medium comprising an instruction set configured to cause a computing device to perform:
  displaying a list of a plurality of supplemental content wherein the plurality of supplemental content is stored in a database and is related to a primary video content;
  receiving a request for a supplemental content of the plurality of supplemental content;
  receiving the requested supplemental content from the database, the database and the computing device being in communication with one another over a network; and
  transmitting the received supplemental content to a video player playing the primary video content for playback of the received supplemental content on the video player;
  wherein the received supplemental content is different than, but related to the primary video content played on the video player, wherein the received supplemental content consists of at least one of a video or sound track, and wherein the video player is configured to play the received supplemental content simultaneously and in synchronization with the primary video content using time code data embedded in at least one of the received supplemental content or the primary video content, wherein playing the received supplemental content simultaneously and in synchronization with the primary video content using the time code data comprises playing an audio track of the supplemental content in place of an audio track of the primary video content, and playing the audio track of the supplemental content simultaneously and in synchronization with a video track of the primary video content using the time code data.

16. The non-transitory computer readable medium of claim 15, further configured to cause the computing device to perform the step of storing the received supplemental content in a non-volatile memory.

17. The non-transitory computer readable medium of claim 15, wherein the step of transmitting the received supplemental content from the computing device to a video player further comprises the steps of:
  communicating with the video player;
  using the communications with the video player to synchronize the received supplemental content with the primary video content;
  and transmitting the received supplemental content from the computing device to the video player in such a way that the received supplemental content can be played on the video player simultaneously and in synchronization with the primary video content.

18. The non-transitory computer readable medium of claim 17, wherein the communications with the video player include the time code data.

19. A non-transitory computer readable medium comprising an instruction set configured to cause a computing device to perform the steps of:
  receiving primary video content for displaying on a video content output;
  receiving supplemental content from a secondary device, the secondary device comprising a secondary display; and
  playing the supplemental content by transmitting the supplemental content to the video content output;
  wherein the supplemental content is different than, but related to the primary video content displayed on the video content output, wherein the supplemental content consists of at least one of a video or sound track, and wherein playing the supplemental content comprises playing the supplemental content simultaneously and in synchronization with the primary video content using time code data embedded in at least one of the supplemental content or the primary video content, wherein playing the supplemental content simultaneously and in synchronization with the primary video content using the time code data comprises playing an audio track of the supplemental content in place of an audio track of the primary video content, and playing the audio track of the supplemental content simultaneously and in synchronization with a video track of the primary video content using the time code data.

20. The non-transitory computer readable medium of claim 19, wherein the step of receiving the supplemental content from the secondary device further comprises streaming the supplemental content from the secondary device.

21. The non-transitory computer readable medium of claim 19, wherein the step of receiving supplemental content from a secondary device onto the video content reader further comprises the step of sending primary video content information to the secondary device for synchronizing the supplemental content with the primary video content.

* * * * *